US009983933B2

(12) United States Patent
Furman et al.

(10) Patent No.: US 9,983,933 B2
(45) Date of Patent: *May 29, 2018

(54) ACCELERATING SYSTEM DUMP CAPTURING

(71) Applicant: INTERNATIONAL BUSINESS MACHINES CORPORATION, Armonk, NY (US)

(72) Inventors: Deborah A. Furman, Staatsburg, NY (US); Andrew C. M. Hicks, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 14/883,823

(22) Filed: Oct. 15, 2015

(65) Prior Publication Data
US 2017/0109234 A1  Apr. 20, 2017

(51) Int. Cl.
G06F 17/00 (2006.01)
G06F 11/14 (2006.01)
G06F 11/07 (2006.01)

(52) U.S. Cl.
CPC ...... *G06F 11/1415* (2013.01); *G06F 11/0706* (2013.01); *G06F 11/0715* (2013.01);
(Continued)

(58) Field of Classification Search
CPC ............ G06F 11/1446; G06F 11/1415; G06F 11/0778; G06F 11/0715; G06F 11/0706;
(Continued)

(56) References Cited

U.S. PATENT DOCUMENTS 9,612,757 B2 * 4/2017 Chakrabarti .......... G06F 3/0619
9,692,662 B2 * 6/2017 Chan ................... H04L 41/5009
(Continued)

OTHER PUBLICATIONS

Huang, Yijian, et al., "Optimizing Crash Dump in Virtualized Environments", VEE '10, Pittsburgh, PA, Mar. 17-19, 2010, pp. 25-36.*
(Continued)

*Primary Examiner* — Robert Stevens
(74) *Attorney, Agent, or Firm* — Cantor Colburn LLP; William A. Kinnaman, Jr.

(57) ABSTRACT

Embodiments include accelerating capture of a system dump at system failure in a computer system. A method includes capturing a system snapshot that includes data from real memory frames of the computer system and storing the system snapshot in a storage. The method also includes monitoring periodically a change between the data in the system snapshot and a current state of the real memory frames of the computer system and updating the system snapshot according to the changed real memory frames based on a rate of change of the real memory frames. Further, in response to encountering the system failure, the snapshot is updated based on a delta between the system snapshot and the current state of the real memory frames. The snapshot on the storage is used as the system dump. The present document further describes examples of other aspects such as systems, computer products.

11 Claims, 5 Drawing Sheets

(52) U.S. Cl.
CPC ...... *G06F 11/0751* (2013.01); *G06F 11/0778* (2013.01); *G06F 11/1446* (2013.01); *G06F 11/1471* (2013.01); *G06F 2201/805* (2013.01); *G06F 2201/84* (2013.01)

(58) Field of Classification Search
CPC ............ G06F 11/0751; G06F 2201/84; G06F 2201/805; G06F 11/1471
USPC ........................................................ 707/650
See application file for complete search history.

(56) References Cited

U.S. PATENT DOCUMENTS

| | | | |
|---|---|---|---|
| 2006/0168471 A1* | 7/2006 | Schulstad | G06F 11/0727 714/6.11 |
| 2009/0006728 A1* | 1/2009 | Green | G06F 9/4418 711/104 |
| 2013/0185379 A1* | 7/2013 | Keller | G06F 11/1438 709/213 |
| 2014/0040669 A1* | 2/2014 | Davis | G06F 11/3636 714/37 |
| 2014/0095823 A1* | 4/2014 | Shaikh | G06F 12/02 711/165 |
| 2014/0149352 A1* | 5/2014 | Chan | G06F 9/455 707/639 |
| 2017/0109227 A1 | 4/2017 | Furman et al. | |

OTHER PUBLICATIONS

Rosenkrantz, Daniel J., "Dynamic Database Dumping", SIGMOD '78, Austin, TX, May 31-Jun. 1978, pp. 3-8.*
List of IBM Patents or Patent Applications Treated as Related; (Appendix P), Filed Jun. 20, 2016; 2 pages.
List of IBM Patents or Patent Applications Treated as Related; (Appendix P), Filed Dec. 21, 2017; 2 pages.

* cited by examiner

ACCELERATING SYSTEM DUMP CAPTURING

BACKGROUND

The present application relates to computer technology, and more specifically, to improving a computer system by improving efficiency of collecting diagnostic information in case of an error.

In a computer system, when an operating system encounters a failure, such as a failure that causes the system to restart, it is desirable to collect diagnostic information on the state of the system and the steps that caused the failure to occur. Accordingly, in case of a failure, the system captures a dump, which is a snapshot of the virtual and/or real storage of the system. The captured snapshot contains information to diagnose the problem that caused the failure. The process of capturing the dump is time sensitive and resource consuming.

SUMMARY

According to an embodiment, a method for accelerating capturing a system dump at system failure in a computer system includes capturing, by a snapshot accelerator, a system snapshot that includes data from real memory frames of the computer system. The method also includes storing, by the snapshot accelerator, the system snapshot in a storage. The method also includes monitoring periodically, by the snapshot accelerator, a change between the data in the system snapshot and a current state of the real memory frames of the computer system. The method also includes updating, by the snapshot accelerator, the system snapshot on the storage according to the changed real memory frames based on a rate of change of the real memory frames. The updated snapshot may not be concurrent with the state of the real memory frames, rather a closest approximation achievable in the given time. Further, in response to encountering the system failure, the method also includes determining, by the snapshot accelerator, a change between the data in the system snapshot and the current state of the real memory frames of the computer system, and updating by the snapshot accelerator the snapshot on the storage according to the changed real memory frames. The method also includes using the snapshot on the storage as the system dump.

According to another embodiment, a computer system includes a processor, a memory; and a snapshot accelerator that captures a system dump at system failure of the computer system. The snapshot accelerator captures a system snapshot that includes data from real memory frames of the computer system. The snapshot accelerator also stores the system snapshot in an external storage. The snapshot accelerator also monitors, periodically, a change between the data in the system snapshot and a current state of the real memory frames of the computer system. The snapshot accelerator also updates the system snapshot on the external storage according to the changed real memory frames based on a rate of change of the real memory frames. In response to the system failure, the snapshot accelerator determines a change between the data in the system snapshot and the current state of the real memory frames of the computer system, and updates the snapshot on the external storage according to the changed real memory frames. The computer system uses the snapshot on the external storage as the system dump.

According to another embodiment, a computer program product for acceleration of capturing a system dump at system failure in a computer system includes computer readable storage medium, the computer readable storage medium including computer executable instructions. The computer readable storage medium includes instructions to capture a system snapshot that includes data from real memory frames of the computer system. The computer readable storage medium also includes instructions to store the system snapshot in an external storage. The computer readable storage medium also includes instructions to monitor, periodically, a change between the data in the system snapshot and a current state of the real memory frames of the computer system. The computer readable storage medium also includes instructions to update the system snapshot on the external storage according to the changed real memory frames based on a rate of change of the real memory frames. The computer readable storage medium also includes instructions to, in response to the system failure, determine a change between the data in the system snapshot and the current state of the real memory frames of the computer system, and update the snapshot on the external storage according to the changed real memory frames. The computer system uses the snapshot on the external storage as the system dump.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
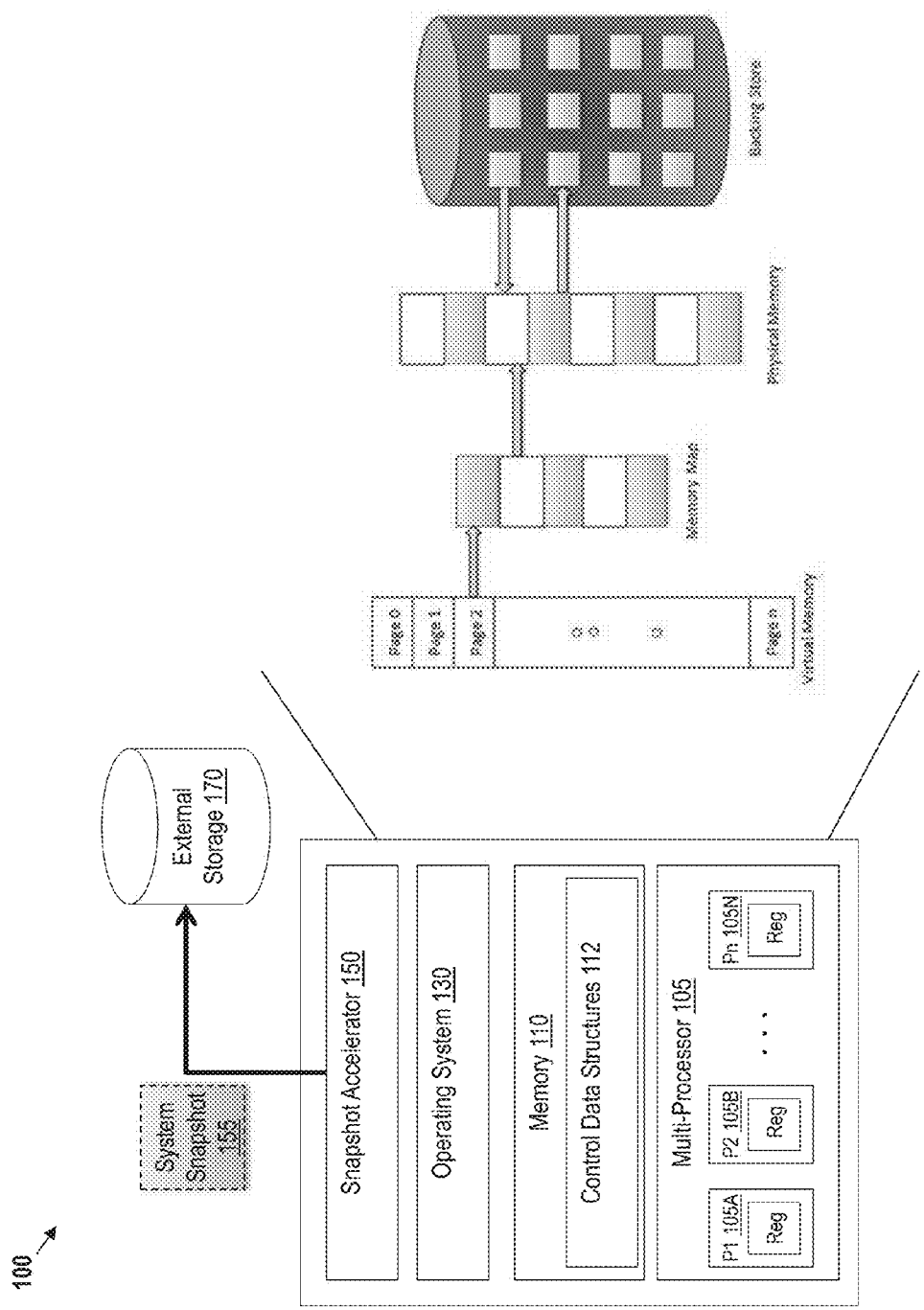
FIG. 1 illustrates an example computer system that includes a snapshot accelerator in accordance with an embodiment.

Disclosed herein are technical solutions for facilitating a computer system to improve capturing a snapshot of diagnostic information in case of a failure, which may cause the system to restart.

Typically, capturing a dump of a computer system, which is the snapshot of the diagnostic information, is a time consuming and resource intensive operation. To capture the dump, the computer system identifies and captures relevant data in real memory and writes the information to storage, such as an internal or an external storage. For example the storage may be a Flash-based storage drive or a disk such as, a holographic storage, a hard disk drive, a solid-state drive, or any other type of a storage disk or drive, or a combination thereof. The computer system preserves the captured dump for analytical purposes after the computer system restarts or resumes. The captured dump includes control structures and system state information that are used to reconstruct the environment at the time of error. For example, the dump data includes data from monitoring the address space, memory, and registers, which change rapidly. In addition, the captured dump includes relevant data in virtual memory that has been paged out to an external storage medium. To capture the data in the virtual memory, the system reads in the paged-out data into real memory (which causes the pages occupying those real frames to be paged out), and then writes those pages to the dump.

Capturing the data to be stored in the dump incurs a time constraint to the system, particularly based on a size of the virtual or real memory footprint of the system. Hence, typically operations to identify, read, and store the data for capturing the dump and documenting the failure, inhibit the system from resuming operations until the dump processing is completed. Thus, the capturing the dump mandates system unavailability, forcing an operating system into a non-dispatchable state, to serialize the snapshot and preserve volatile 'time of error' data. Further, typically, time constraints are introduced throughout the capture and off-loading of the snapshot to the external storage disk.

A user of the computer system does not have access to the system while the system captures the dump. Use of flash based storage disk help accelerate writing of the dump. Further yet, an example computer system may reserve a portion of real memory that will be allocated exclusively to capture/store dump data. While such techniques may reduce the time of capturing the dump, they require the user to purchase a dedicated real memory for this purposes and may be cost prohibitive. Furthermore, such techniques fail to alleviate the time constraints derived from writing the snapshot to an external medium.

The technical solutions described herein alleviate such technical problems when capturing the dump by using a system snapshot accelerator to orchestrate capturing the dump. The snapshot accelerator may be an internal processor, a co-processor, a hardware accelerator, a Virtual Machine (VM), or a distributed node that continuously takes snapshots of the system state to reduce system down time and handles the infrastructure of capturing the dump. For example, the snapshot accelerator continuously checks deltas between an active state of the operating system and the stored snapshot. When an inconsistency is encountered, the snapshot accelerator updates the snapshot to mirror the active state of the operating system. The snapshot resides on a non-volatile externally accessible storage medium. The snapshot accelerator samples the delta at a predetermined granularity, to reduce the time to capture the dump to be the time to capture a delta, which is relatively lesser.

The snapshot accelerator, thus, relieves the system load at the time of capturing dump since the computation required and time constraint to complete the dump process is bounded to the time frame between snapshot and system failure. Since a snapshot by the snapshot accelerator is not concurrent with a single instance of the system, the dump data at the time of the failure that is used for diagnostic purposes at restart, is a close approximation of the system state at the time of the failure. The snapshot is off by a delta, which is based on the predetermined granularity. Thus, the snapshot is close to the state of the system at the time of failure, rather than concurrent. This reduces total computation required at the time of capturing the dump, placing an upper bound (the delta between snapshot and system failure) on the total time of capturing the dump. Thus, the technical solutions described herein use a dedicated processor to capture the dump resulting in an instantaneous dump capture by continuously updating approximation of the delta, resulting in lesser overhead on the system resources.

FIG. 1 illustrates an example computer system that use the technical solutions described herein. The computer system 100 includes, among other components, a processor 105, a memory 110, an operating system 130, and a snapshot accelerator 150. The snapshot accelerator 150 stores a snapshot 155 to an external storage 170.

The processor 105 is a central processor of the system 100, and is responsible for execution of the operating system 130, the applications, and any other executable instructions. The processor 105 is operable to execute logic. The logic includes computer executable instructions or computer code embodied in the memory 110 or in other memory that when executed by the processor 105, cause the processor 105 to perform the features implemented by the logic. The computer code includes instructions executable with the processor 105. The computer code may include embedded logic. The computer code may be written in any computer language now known or later discovered, such as C++, C#, Java, Pascal, Visual Basic, Perl, HyperText Markup Language (HTML), JavaScript, assembly language, shell script, PL/X, zTT, REXX, or any combination thereof. The computer code may include source code and/or compiled code. The processor 105 may be a general processor, a Central Processing Unit (CPU), a server, an Application Specific Integrated Circuit (ASIC), a Digital Signal Processor (DSP), a Field Programmable Gate Array (FPGA), a digital circuit, an analog circuit, a multi-processor, or combinations thereof. The processor 105 is in communication with the memory 110, the operating system 130, and other components of the system 100. The processor 105 includes registers that contain data that is being used for operation of the system 100. If the processor 105 is a multi-processor that includes multiple processors 105A-105N, each of the processors has respective register sets. For example, registers may contain address of an instruction that the processor is currently executing, a next instruction in queue, data that the executing instruction is operating on, and other such operational data.

The memory 110 includes non-transitory computer readable storage medium. The memory 110 stores control instructions and data of the operating system 130 and other applications that are executable by the processor 105. In addition, the memory 110 may contain other data such as images, videos, documents, spreadsheets, audio files, and other data that may be associated with operation of the system 100. For example, the memory 110 includes control data structures 112. The control data structures 112 include data associated with the current operations being performed by the operating system 130. For example, the control data structures may contain page tables that represent associations between virtual memory and real memory, data identifying a current state of the applications, user interface information, and other information useful to for operation of the system 100. The memory 110 includes primary memory, which is volatile memory such as dynamic random-access memory (DRAM), static random-access memory (SRAM), or any other type of volatile memory or a combination thereof. The memory 110 also includes secondary memory, which is non-volatile memory such as hard disks, magnetic tape, flash memory, or any other type of non-volatile memory or combination thereof.

The operating system 130 is responsible for managing the operations of the system 100. The operating system 130 may be any operating system such as z/OS™, WINDOWS™, LINUX™, OS/X™, or any other operating system. For example, the operating system 130 allocates a virtual address space from a virtual storage to an application. The virtual storage is the span of memory addresses available to the processor with a dynamic address translation (DAT) feature enabled. The operating system 130 is responsible to maintain the control data structures 112 in the memory 110.

The snapshot accelerator 150 facilitates the operating system 130 to continuously capture the snapshot 155 and store the snapshot 155 onto the external storage 170. The snapshot accelerator may be an internal processor, a co-processor, a hardware accelerator, a VM, or a distributed node. In other examples, the snapshot accelerator 150 may be hardware such as electronic circuitry, for example an ASIC, an FPGA, a DSP, a graphics processing unit (GPU), or any other digital or analog circuitry.

The snapshot accelerator 150 continuously monitors the state of the operating system 130. In an example, the snapshot accelerator 150 queries a changed bit that identifies delta between an active state of the operating system 130 and the snapshot 155. Based on the changed bit(s), the snapshot accelerator synchronizes the snapshot 155 by updating stale data and store an updated snapshot to the external storage 170. The updated snapshot is used as the snapshot 155 in a subsequent comparison with the active state of the operating system 130.

The snapshot 155 is a system image of the system 100 and contains diagnostic information that the operating system 130, or a system technician may use to determine a cause of the system failure. For example, the diagnostic information contains state of the registers of the processor(s) 105, the control data structures 112, and any other data that the operating system 130 marks for storage within the snapshot 155.

The external storage 170 stores the system snapshot 155. The external storage 170 may also store deltas between the snapshot 155 and an active state of the system 100. The external storage 170, although is illustrated as being outside a physical boundary of the system 100, in an example, the external storage 170 may be physically within the system 100. The external storage 170 may be a non-volatile storage disk such as a flash disk, a holographic storage, a hard disk drive, a solid-state drive, or any other type of a storage disk or a combination thereof.

Figure 2:
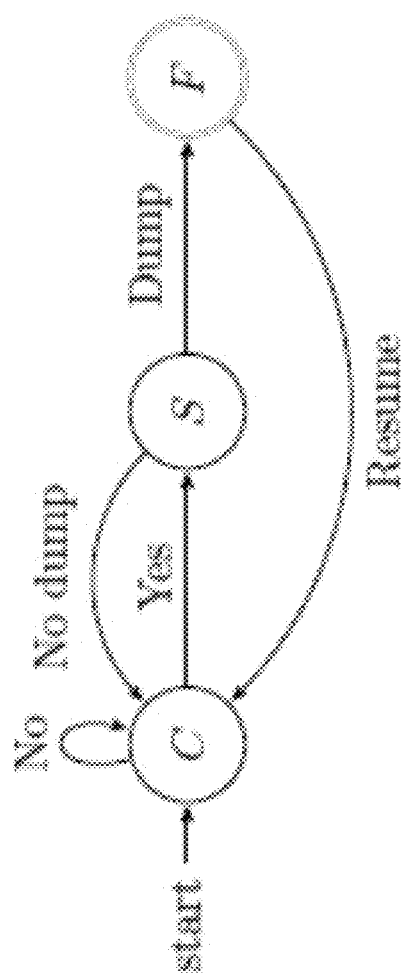
FIG. 2 illustrates an example state diagram of a snapshot accelerator in accordance with an embodiment.

FIG. 2 illustrates an example state diagram of the snapshot accelerator 150. The snapshot accelerator 150 starts according to an initial set-up (start). The snapshot accelerator may determine if the external storage 170 already contains a snapshot 155. If the snapshot 155 exists, the snapshot accelerator 150 proceeds as described herein. Alternatively, the snapshot accelerator 150 proceeds to capture the snapshot 155 and store the snapshot 155 onto the external storage 170. The snapshot accelerator 150 compares the snapshot 155 with an active state of the operating system 130, to check for any change, for example by calculating a delta (state C). If the snapshot accelerator 150 detects a change, the snapshot accelerator 150 captures and records a new snapshot of the system state (state S). The snapshot accelerator 150 continuously operates between the states C and S until a system failure occurs. On the occurrence of a system failure, the snapshot accelerator 150 initiates the dump process, calculates the delta, and brings the snapshot into its final concurrent state (state F).

Figure 3:
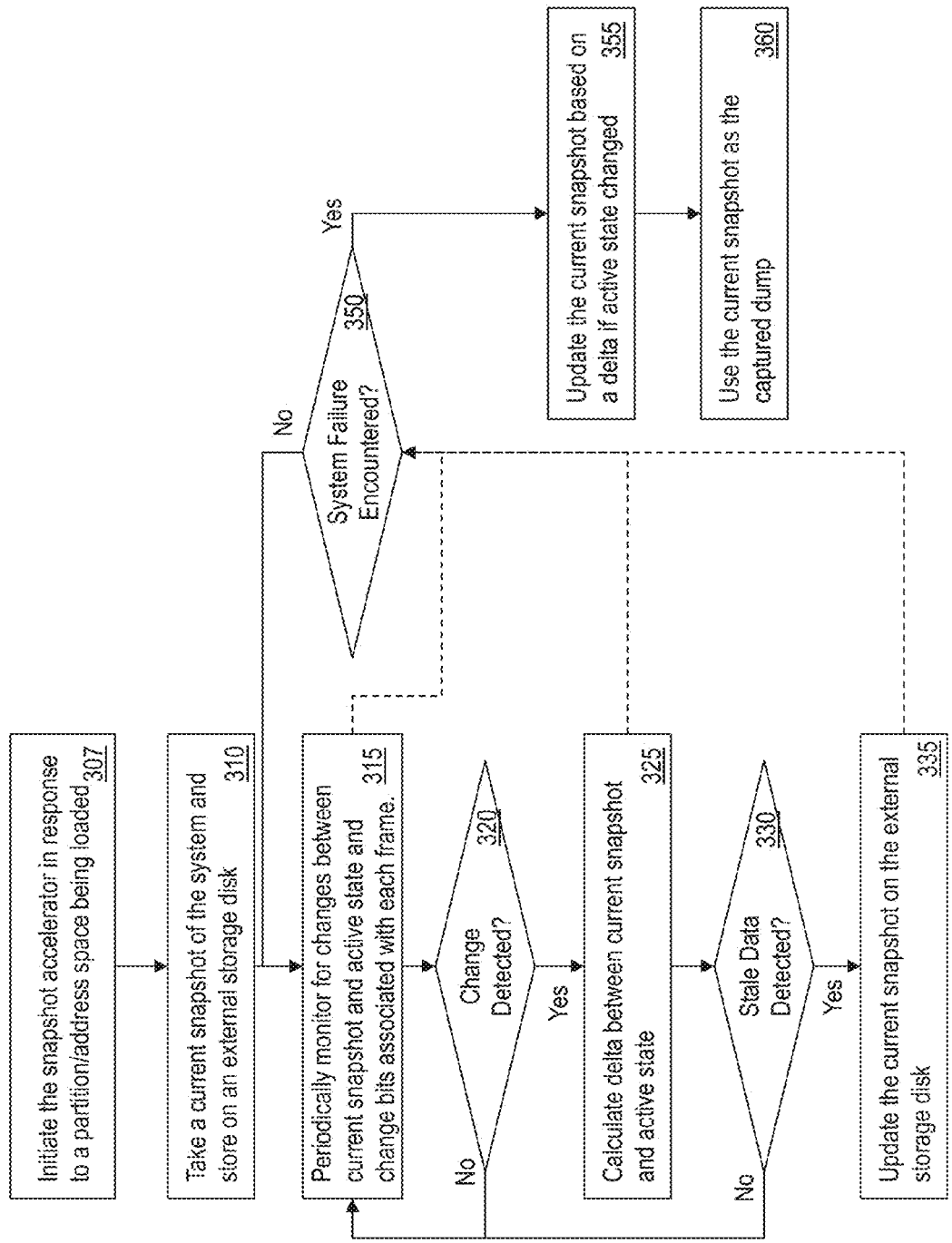
FIG. 3 illustrates an example flowchart for accelerating capture of a system dump using a snapshot accelerator in accordance with an embodiment.

FIG. 3 illustrates an example logic that the snapshot accelerator 150 implements in an example. For example, the snapshot accelerator 150 gets control when the operating system 130 loads a logical partition/address space into the system 100, as shown at block 307. For example, the system loads a partition at system startup, initiating the snapshot accelerator 150 at system startup. The snapshot accelerator 150 captures a system snapshot at initiation, as shown at block 310. The snapshot accelerator 150 stores the snapshot onto the external storage 170. The snapshot accelerator 150 periodically monitors the active state of the system to detect changes from the snapshot stored on the external storage 170, as shown at blocks 315 and 320. For example, the snapshot accelerator 150 indicates that a real memory frame from the memory 110 of the system 100 has changed since the previous snapshot was captured by setting a bit associated with the frame. For example, in the z/OS™ operating system, a frame is associated with a 7-bit field, which includes a 'changed' bit. The snapshot accelerator 150 may set the changed bit in z/OS™. The snapshot accelerator 150 monitors the active state of the system according to a predetermined schedule, such as every hour, every two minutes, or any other predetermined schedule, which may be user configurable.

The snapshot accelerator 150 subsequently uses the bits associated with the real memory frames of the active state to calculate a delta (change) between the active state and the snapshot, as shown at block 325. For example, the snapshot accelerator scans for all the real memory frames that have the corresponding changed bit set. In another example, the snapshot accelerator 150 may issue a hardware instruction to identify any set bits. If one or more changed bits are identified, the snapshot accelerator 150 has detected stale data, which indicates that the snapshot on the external storage 170 is not up to date, as shown at block 330. If the snapshot accelerator 150 detects stale data, the snapshot accelerator 150 writes updated data to the external storage 170, that is updates the snapshot, as shown at block 335. The snapshot accelerator 150 continues to monitor and update the snapshot on the external storage 170 until a system failure is encountered. In an example, the snapshot accelerator 150 monitors the active state of the system after a predetermined duration of time has passed, for example every 1 millisecond, every 2 milliseconds, or any other time duration. The time duration may be configurable. Alternatively, the snapshot accelerator 150 monitors the active state after a predetermined number of instructions are complete, for example after every 10 instructions, or every 100 instructions, or any other number of instructions. The predetermined number of instructions may be configurable. In yet another example, in addition to monitoring the active state periodically, the snapshot accelerator 150 monitors the active state of the system after an operation from a predetermined set of operations completes. For example, the predetermined operations may include, starting a new application, shutting down an application, minimizing an application, putting the system in stand-by mode, or any other such operation.

At any time during the operation of the system, if a system failure is encountered, the snapshot accelerator checks for differences between the active state and the snapshot, as shown at blocks 350 and 355. The differences are detected based on the bits associated with the real memory frames in the active state. Thus, the snapshot accelerator 150 brings the snapshot to a state consistent with the active state. The snapshot on the external storage 170 is now the system dump that the system 100 uses to diagnose the system failure that was encountered, as shown at block 360. In an example, the system 100 may transmit the snapshot to a diagnostic system or a system technician (not shown). The snapshot accelerator 150 may encrypt and compress the snapshot prior to transmission. Alternatively or in addition, the snapshot accelerator 150 encrypts and compresses the snapshot even if the snapshot is not being transmitted.

In an example, upon encountering the system failure, and after updating the system snapshot on the external storage 170 according to a delta with the current state of the real memory frames, the snapshot accelerator may append the snapshot with data from the registers of the processor 105 in the system 100. Accordingly, the snapshot contains a state of the entire system 100 at the time of the system failure.

The system 100 upon restarting resumes the snapshot capturing by initializing the snapshot accelerator 150, which captures another snapshot of the system 100. In an example, the snapshot accelerator 150 overwrites the snapshot from the previous iteration.

Figure 4:
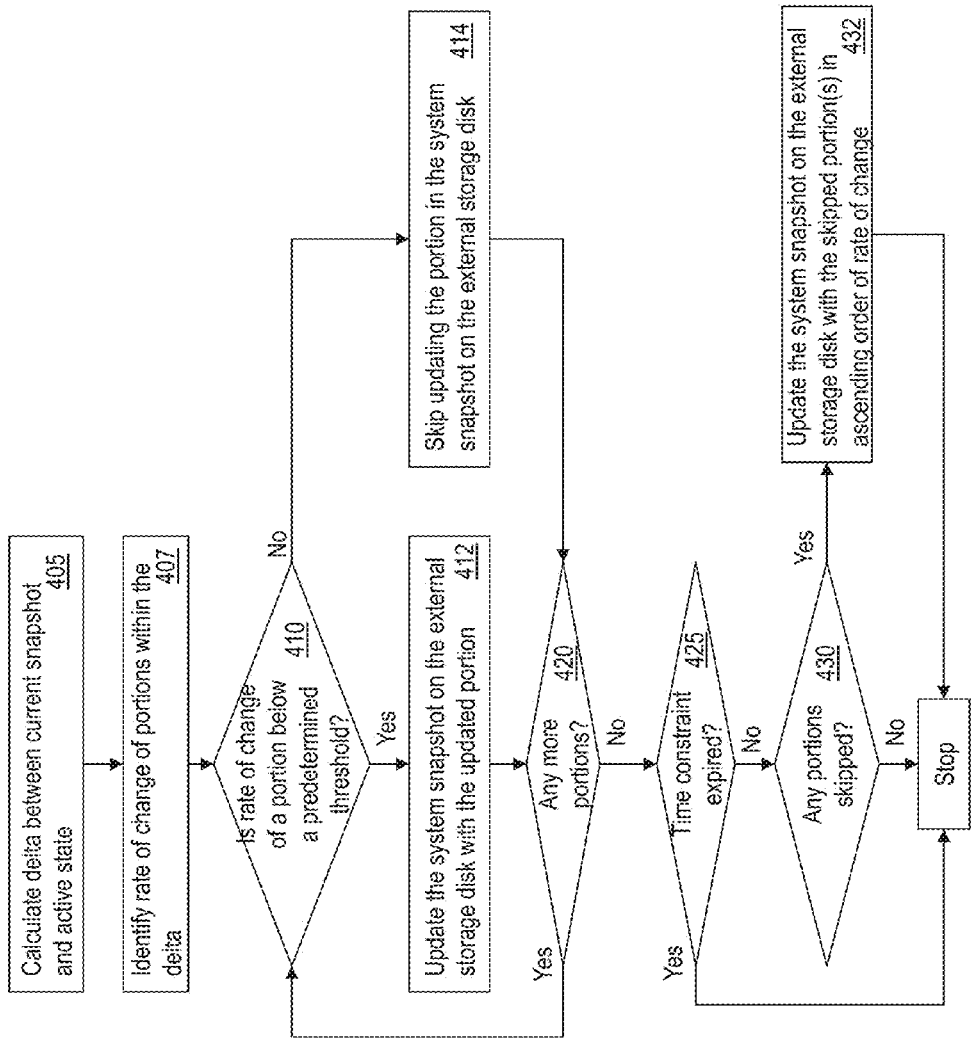
FIG. 4 illustrates an example flowchart for updating a system snapshot on an external storage based on a rate of change of portions of a delta.

The snapshot accelerator 150 captures the snapshot based on a frequency of change of a subset of the system state. Referring to a flowchart illustrated in FIG. 4, the process of updating the system snapshot on the external storage is further described. The snapshot accelerator 150 updates the system snapshot on the external storage 170 so that the data that is changing less frequently, that is the more consistent data portions, are updated prior to updating data that is changing more frequently. For example, consider that the system snapshot includes three portions, A, B, and C. The snapshot accelerator 150 calculates a delta, that is, the change, between the system snapshot on the external storage 170 and the current state of the system 100, as shown at block 405, and as described herein.

The snapshot accelerator 150 determines a frequency of change of each part in the delta, as shown at block 407. For example, consider that A changes more frequently (or rapidly) than B, which in turn changes more frequently than C. The snapshot accelerator 150, in an example, orders the portions according to the rate of changes and updates the portion with the least rate of change first and the portion with the maximum rate of change last. Thus, in this case, C is updated first and A is updated last. In another example, the snapshot accelerator compares the rate of change of each portion with a predetermined rate of change, as shown at block 410. If the rate of change of the portion is below the predetermined threshold, indicating that the portion is consistent, the snapshot accelerator 150 updates the system snapshot on the external storage 170 according to the updated portion, as shown at block 412. Alternatively, if the rate of change is above the predetermined threshold, the snapshot accelerator 150 skips updating that portion at the time, as shown at block 414. After all portions of the delta have been considered, and if the time constraint mandated by the operating system has not expired, the snapshot accelerator checks if any portions of the delta were skipped, as shown at blocks 420, 425, and 430. If there are skipped portions, the snapshot accelerator 150 updates those portions of the system snapshot, again according to the respective rates of change, either by ordering the skipped portions according to the rate of change or by comparing with a second predetermined threshold.

Figure 5A:
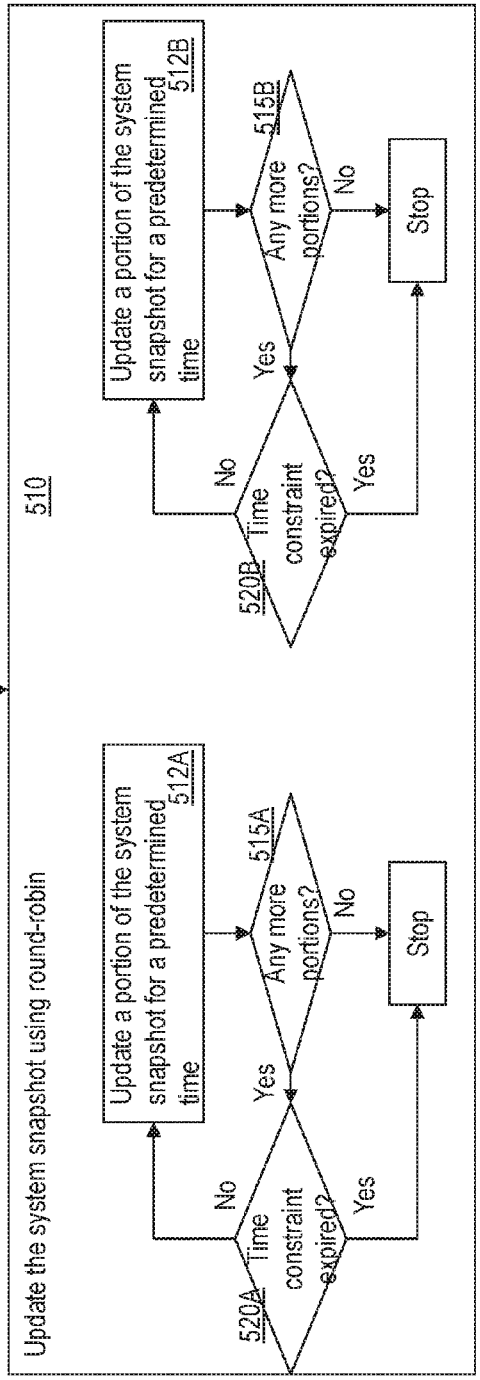
FIG. 5A illustrate flowcharts for updating system snapshot on an external storage based on predetermined scheduling schemes.
Figure 5B:
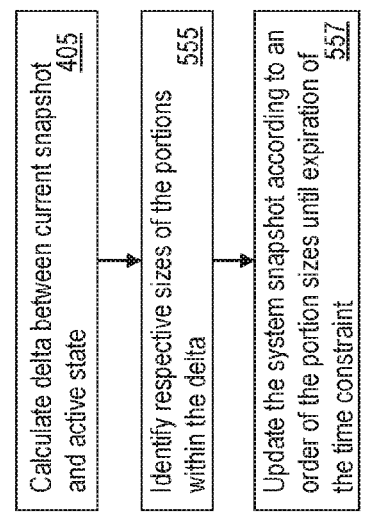
FIG. 5B illustrate flowcharts for updating system snapshot on an external storage based on predetermined scheduling schemes.

In another example, the snapshot accelerator 150 updates the system snapshot on the external storage 170 according to a predetermined scheme, such as round robin, smallest change first, or any other scheme. FIG. 5A illustrates a flowchart of the snapshot accelerator 150 using a round-robin scheme. For example, in the above example with three portions A, B, and C in the delta, the snapshot accelerator 150 may employ a round robin scheme to update the snapshot on the external storage 170, such that an equal part of each portion A, B, and C is updated, until the system mandated time constraint is reached, as shown at blocks 512A, 515A, and 520A. For example, the snapshot accelerator 150 updates a part of the portion A followed by a part of the portion B, and a part of the portion C, where each part is of equal size. In another example, the snapshot accelerator 150 updates each portion for an equal amount of predetermined time, as shown at the blocks 512B, 515B, and 520B. The snapshot accelerator 150 updates the snapshot in this manner until the time constraint is reached, or the entire delta is reflected by the snapshot in the external storage 170, as shown at blocks 515A and 520A, and 515B and 520B. Alternatively, in the smallest change first scheme, the snapshot accelerator 150 determines which of the three portions A, B, and C contains the least amount of change and updates the smallest portion first, as shown at blocks 555 and 557. For example, if A is 5 MB, B is 4 MB, and C is 100 KB, the snapshot accelerator updates the system snapshot in the external storage 170 in the order C-B-A. Of course, other examples may have more portions and different portion sizes. Further, the round robin scheme and the smallest change first are just two of various other schemes that the snapshot accelerator 150 may employ to update the system snapshot.

Accordingly, the snapshot accelerator 150 captures memory that is constantly changing after updating the other delta locations, and captures the rapidly changing or dirtying memory last. In case of a system failure prior to capturing the rapidly changing portion, such as A in the above example, the snapshot accelerator 150 captures a close approximation of the system state that includes the portions, such as B and C, which update over a consistent rate. Accordingly, in case of a system failure, by updating the system snapshot that has been continuously updated, the snapshot accelerator facilitates capturing the system dump within the time and resource constraints.

Thus, as described herein, the snapshot accelerator 150 is a separate hardware component, such as a coprocessor, that captures a snapshot of the system at initialization and continuously monitors the active state of the system for changes and updates the snapshot continuously. Updating the snapshot in the periodic manner facilitates the snapshot accelerator to maintain a most recent snapshot of the system in the external storage disk. Further, updating only the changes in a continuous manner is relatively less resource intensive than capturing an entire snapshot in response to a system failure. Further yet, updating only the changes is relatively quicker compared to capturing the entire snapshot in response to the system failure, and the update can be performed in the time constraints that the system may be mandated. The snapshot accelerator 150 updates the portions of the system snapshot on the external storage based on the rate of change associated with each portion. Accordingly, the snapshot accelerator 150 updates only a subset of the system snapshot within the mandated time constraints. Hence, the system snapshot on the external storage may not be entirely concurrent with the state of the system, but a close approximation that includes portions of the system state that have a more consistent rate of change. Accordingly, in case of a system failure, by updating the system snapshot that has been continuously updated, the snapshot accelerator facilitates capturing the system dump within the time and resource constraints.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, PL/X, zTT, REXX, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer system, comprising:
   a processor;
   a memory; and
   a snapshot accelerator that captures a system dump at system failure in the computer system, wherein the snapshot accelerator is configured to:
      capture a system snapshot that comprises data from real memory frames of the computer system;
      store the system snapshot in an external storage;
      monitor, periodically, for a change between the data in the system snapshot and a current state of the real memory frames of the computer system;
      update the system snapshot on the external storage according to the changed real memory frames based on a rate of change of the real memory frames; and
   in response to the system failure:
      determine a change between the data in the system snapshot and the current state of the real memory frames of the computer system;
      update the snapshot on the external storage according to the changed real memory frames; and
      use the snapshot on the external storage as the system dump.

2. The system of claim 1, wherein the change between the data in the system snapshot and the current state of the real memory frames of the computer system is determined based on a plurality of change bits respectively associated with the real memory frames.

3. The system of claim 1, wherein the snapshot accelerator is further configured to append data from registers of the processor to the system snapshot in response to the system failure.

4. The system of claim 1, wherein updating the system snapshot on the external storage comprises:
   determining a rate of change of each portion from a plurality of portions in the changed data between the system snapshot on the external storage and the current state of the real memory frames;
   ordering the portions in the changed data according to the rate of change; and
   updating the system snapshot on the external storage according to the ordered portions.

5. The system of claim 1, wherein the snapshot accelerator updates a portion of the system snapshot on the external storage in response to the rate of change of the real memory frames corresponding to the portion being below a predetermined threshold.

6. The system of claim 1, wherein updating the system snapshot on the external storage comprises updating portions of the changed data between the system snapshot on the external storage and the current state of the real memory frames according to a predetermined scheduling scheme.

7. The system of claim 1, wherein the snapshot accelerator is configured to periodically monitor the change based on at least one of a predetermined time duration between successive comparisons of the system snapshot and the current state of the real memory frames of the computer system and completion of a predetermined number of instructions between successive comparisons of the system snapshot and the current state of the real memory frames of the computer system.

8. A computer program product for acceleration of capturing a system dump at system failure in a computer system, the computer product comprising non-transitory computer readable storage medium, the non-transitory computer readable storage medium comprising computer executable instructions, wherein the non-transitory computer readable storage medium comprises instructions to:
   capture a system snapshot that comprises data from real memory frames of the computer system;
   store the system snapshot in an external storage;
   monitor, periodically, for a change between the data in the system snapshot and a current state of the real memory frames of the computer system;
   update the system snapshot on the external storage according to the changed real memory frames based on a rate of change of the real memory frames; and
   in response to the system failure:
      determine a change between the data in the system snapshot and the current state of the real memory frames of the computer system;
      update the snapshot on the external storage according to the changed real memory frames; and
      use the snapshot on the external storage as the system dump.

9. The computer program product of claim 8, wherein the update of the system snapshot on the external storage frames based on a rate of change of the real memory frames comprises updating portions of the changed data between the system snapshot on the external storage and the current state of the real memory frames according to a predetermined scheduling scheme.

10. The computer program product of claim 8, wherein the update of the system snapshot on the external storage frames based on a rate of change of the real memory frames comprises:
   determination of a rate of change of each portion from a plurality of portions in the changed data between the system snapshot on the external storage and the current state of the real memory frames;
   ordering of the portions in the changed data according to the rate of change; and
   the system snapshot on the external storage being updated according to the ordered portions.

11. The computer program product of claim 8, wherein the computer executable instructions further comprise instructions to append data from registers of the computer system to the snapshot in response to the system failure.

* * * * *